(12) United States Patent
Cheng et al.

(10) Patent No.: US 11,769,385 B2
(45) Date of Patent: *Sep. 26, 2023

(54) ONLINE INDUSTRIAL FLARE SMOKE AUTO-DETECTION AND OFF-LINE SMOKING EVENT REPORTING

(71) Applicant: GENERAL CYBERNATION GROUP, INC., Rancho Cordova, CA (US)

(72) Inventors: George Shu-Xing Cheng, Folsom, CA (US); Andrew J. Chow, Sacramento, CA (US); Manuel Martinez, North Highlands, CA (US)

(73) Assignee: General Cybernation Group, Inc., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,757

(22) Filed: Sep. 30, 2022

(65) Prior Publication Data

US 2023/0022920 A1     Jan. 26, 2023

Related U.S. Application Data

(63) Continuation of application No. 17/183,817, filed on Feb. 24, 2021, now Pat. No. 11,462,089.

(Continued)

(51) Int. Cl.
*G08B 17/10*     (2006.01)
*G05B 19/418*     (2006.01)
(Continued)

(52) U.S. Cl.
CPC ......... *G08B 17/10* (2013.01); *G05B 19/4183* (2013.01); *G05B 19/4188* (2013.01); *G06F 16/75* (2019.01); *G06V 20/52* (2022.01)

(58) Field of Classification Search
CPC ............... G08B 17/10; G05B 19/4183; G05B 19/4188; G06F 16/75; G06V 20/52
See application file for complete search history.

(56) References Cited

U.S. PATENT DOCUMENTS

10,253,995 B1 *   4/2019   Grant ....................... F24F 11/30
11,074,501 B2 *   7/2021   Bang ...................... G06N 3/047
(Continued)

*Primary Examiner* — Ojiako K Nwugo
(74) *Attorney, Agent, or Firm* — STOUT, UXA & BUYAN, LLP; Donald E. Stout (57) ABSTRACT

A system and computer software mechanism is disclosed that can automatically detect smoking conditions for industrial flares. In an online mode, the software mechanism can analyze live video images to identify smoking conditions and generate a "Smoke Level" value to represent the seriousness of the smoking events. In an off-line mode, the software mechanism can load saved video files and analyze video images to identify smoking conditions and generate a "Smoke Level" value to represent the seriousness of the smoking events. In the online mode, the Smoke Level data can be sent to the plant distributed control system (DCS) or other control devices so alarms can be generated and automatic or manual control actions can be taken quickly to stop the flare from smoking. In both online and off-line modes, Smoke Level data can also be saved in historical files for reporting and smoke event tracking purposes. Using the described system and software mechanism, industrial plants can comply with EPA regulations at all times, improve flare control and monitoring, be better prepared for EPA reporting and auditing, and save energy and manpower.

22 Claims, 11 Drawing Sheets

Related U.S. Application Data

(60) Provisional application No. 62/980,895, filed on Feb. 24, 2020.

(51) Int. Cl.
*G06F 16/75* (2019.01)
*G06V 20/52* (2022.01)

(56) References Cited

U.S. PATENT DOCUMENTS

| | | | |
|---|---|---|---|
| 2017/0289650 A1* | 10/2017 | Schattmaier | G06N 5/046 |
| 2018/0047271 A1* | 2/2018 | Bai | G06V 20/49 |
| 2019/0066474 A1* | 2/2019 | Mallela | H04L 67/1097 |
| 2019/0262637 A1* | 8/2019 | Statter | A62C 3/0214 |
| 2019/0279478 A1* | 9/2019 | Ebata | G06T 7/254 |
| 2020/0103881 A1* | 4/2020 | Halgren, III | G05D 1/0027 |
| 2020/0106990 A1* | 4/2020 | Farzone | H04L 9/0825 |
| 2020/0334470 A1* | 10/2020 | Abeykoon | G06V 10/96 |
| 2021/0043069 A1* | 2/2021 | De Vries | G06V 20/52 |
| 2021/0192175 A1* | 6/2021 | Pineda | G06F 18/214 |

\* cited by examiner

Fig. 12 ately detect smoking conditions for industrial
ONLINE INDUSTRIAL FLARE SMOKE AUTO-DETECTION AND OFF-LINE SMOKING EVENT REPORTING This application is a continuation of U.S. application Ser. No. 17/183,817 filed on Feb. 24, 2021, which is herein incorporated by reference. This application claims priority to U.S. Provisional Application No. 62/980,895 filed on Feb. 24, 2020, which is herein expressly incorporated by reference, in its entirety.

BACKGROUND OF THE INVENTION

The subject of this patent relates to video image processing, artificial intelligence, and automatic control of physical processes including industrial flares.

The regulations by the United States EPA (Environmental Protection Agency) (CFR-60.18) require industrial flares to operate with no visible emissions, except for periods not to exceed a total of 5 minutes during any 2 consecutive hours. Most oil refineries and petrochemical plants in the U.S. have installed video cameras to monitor their flares 24 hours a day, 7 days a week and save videos in a computer system ready for EPA's audits. Operators are trained to watch real-time flare videos all day long. When a smoke event occurs, the operator is responsible to catch the event and take immediate actions. Typically, a steam or air valve is opened by the operator through a control system override function to add a lot of air or steam to assist flare combustion so that the flare can get out of the smoking condition quickly.

SUMMARY OF THE INVENTION

It is tedious for operators to watch live flare videos all day long to prevent flares from smoking. It would be desirable to have a system that can watch the videos and detect smoking events automatically. In addition, it would be advantageous to integrate flare live video monitoring, smoke auto-detection, alarming, control override, historical data analysis, and flare smoke tracking functions with the flare control system and flare reporting system that have been in place in the plant. Such a combined system can help the plant comply with EPA regulations at all times, improve flare control and monitoring, be better prepared for EPA reporting and auditing, and save energy and manpower.

In this application, a method and system is disclosed that can automatically detect smoking conditions for industrial flares. The system has a configuration mode that can view saved flare videos so that each flare and camera can be calibrated using a user selectable Area of Interest (AOI) and a user selectable Smoke Detection Index (SDI) for a smoke auto-detection mechanism. The system also has an online mode that can connect to one or multiple video cameras over a communication network so that live flare videos can be viewed and analyzed by the smoke auto-detection mechanism in real-time. The flare smoke conditions are reported using Smoke Level, a value in the range of 0 to 10, where 0 means no smoke and 10 indicates that the flare has the highest smoking condition. The Smoke Level can be sent in real-time to a distributed control system (DCS) of the plant to trigger an alarm in the control room, and control override actions can be taken automatically by the DCS or manually by an operator to take the flare out of smoke quickly. In addition, in a historical mode, the Smoke Level data that have been saved in historical files can be reviewed for smoke condition tracking, EPA reporting and auditing, and flare operation management.

More particularly, in one aspect of the invention there is disclosed a flare smoke auto-detection system, which comprises:
 a) at least one industrial flare;
 b) at least one video camera; and
 c) a computer system that is programmed and configured to automatically analyze live videos and detect flare smoking conditions. The computer system may be programmed and configured to further perform alarming, control, historical data analysis, and reporting functions. The video camera may be a digital camera or a network camera that can send live videos to one or multiple computers or decoders for video viewing and storage.

The computer system may further comprise:
 a) a computer;
 b) a camera to computer interface mechanism;
 c) a video storage computer;
 d) a computer software mechanism with smoke auto-detection engine;
 e) a computer to control system interface mechanism;
 f) a historical data analysis and reporting mechanism;
 g) a human-machine-interface (HMI) mechanism; and
 h) a data storage.

In another aspect of the invention, there is disclosed a computer software mechanism for flare smoke auto-detection, which comprises:
 a) a smoke auto-detection engine;
 b) a camera to computer interface mechanism; and
 c) a human-machine-interface (HMI) mechanism. The computer software mechanism may further comprise a data storage and a historical data analysis and reporting mechanism.

The smoke auto-detection engine may be programmed to generate a Smoke Level value in the range of 0 to 10 to represent the seriousness of the smoking events. The Smoke Level data generated by the smoke auto-detection engine are sent to the plant distributed control system (DCS) or other control devices so alarms can be generated and automatic or manual control actions can be taken to stop the flare from smoking. The Smoke Level data may also be saved in historical files for reporting and smoke event tracking purposes.

The camera to computer interface mechanism may be arranged for the computer to receive live video streams from a digital camera or a network camera. The human-machine-interface (HMI) mechanism may be programmed to show computer screens that allow the user to configure, view, and monitor the flare smoke auto-detection system, and may be also programmed to comprise at least one software window showing a flare video, and at least one time-amplitude diagram illustrating the flare Smoke Level for configuration and saved video viewing purposes. Additionally, the HMI mechanism may be programmed to comprise a graph showing a flare video with a user selectable window to determine an Area of Interest (AOI), as well as a user selectable bar to determine a Smoke Detection Index (SDI) for the flare video so that each camera and flare can be calibrated for a smoke auto-detection mechanism.

In addition to the foregoing, the HMI mechanism may be programmed to comprise a time-amplitude diagram that shows the Smoke Level based on the x-axis scale in time and y-axis scale in Smoke Level between 0.0 to 10.0, where 0 means that there is no smoke and 10.0 means the smoke has reached its highest condition, as well as a computer software button that allows the user to start and stop playing a flare video. The HMI mechanism may be programmed to comprise:

a) at least one graph showing a live flare video;

b) a corresponding software button that allows the user to select a flare camera to connect and view live videos for smoke auto-detection;

c) a corresponding software button that allows the user to toggle the logging on/off function for the Smoke Level data; and d) at least one time-amplitude diagram illustrating the flare Smoke Level for real-time smoke auto-detection, alarming, and control purposes.

The HMI mechanism may further be programmed to comprise at least one graph showing a time-amplitude diagram illustrating the historical data of flare Smoke Level with date and time stamps for smoke event tracking and reviewing, and at least one software button that allows the user to select saved historical files for one or multiple flares. Additionally, the HMI mechanism may be programmed to comprise:

a) a software button that allows the user to show the earliest saved historical data;

b) a software button that allows the user to go back to look for earlier historical data;

c) a software button that allows the user to go forward to look for more recent historical data;

d) a software button that allows the user to show the most recent saved historical data;

e) a software button that allows the user to show the daily data;

f) a software button that allows the user to show the weekly data;

g) a software button that allows the user to show the monthly data;

h) a software button that allows the user to show the yearly data; and i) a software button that allows the user to show the 5-year data.

The invention further includes programming the HMI mechanism to comprise:

a) at least one graph showing a time-amplitude diagram illustrating the historical data of flare Smoke Level with date and time stamps for smoke event tracking and reviewing;

b) at least one software button that allows the user to select saved historical files for one or multiple flares; and c) a Summary software button that allows the user to select the latest saved historical files for all flares.

Still another feature of the present invention includes having the HMI mechanism be programmed to comprise:

a) at least one graph showing a time-amplitude diagram illustrating the historical data of flare Smoke Level with date and time stamps for smoke event tracking and reviewing;

b) at least one software button that allows the user to select saved historical files for one or multiple flares; and c) a software button that allows the user to see the smoking time periods that exceed a total of 5 minutes during any 2 consecutive hours, each of the time period violating the rules defined by a government regulatory agent is marked by an alarm box.

The software may be programmed to work in a configuration mode to iteratively:

a) enter the configuration mode and allow the user to select a flare video file;

b) load the selected video file and play the video based on a user's command;

c) analyze the flare video based on the smoke auto-detection engine;

d) allow the user to adjust and save the Area of Interest (AOI) for the selected camera;

e) allow the user to adjust and save the Smoke Detection Index (SDI) for the selected camera; and f) show the Smoke Level in a time-amplitude diagram.

The software may also be programmed to work in an online mode to iteratively:

a) enter the online mode and allow the user to select a flare camera;

b) connect to the selected video camera and receive live videos from the camera;

c) load the saved AOI and SDI values for the selected camera from a database file;

d) analyze the live flare video based on the smoke auto-detection engine;

e) show the Smoke Level data in real-time;

f) send the Smoke Level data to the plant distributed control system (DCS) that controls the corresponding flare for alarming and control; and g) save the Smoke Level data to a historical file.

In still another aspect of the invention, there is disclosed a method of automatically detecting smoking conditions for industrial flares. The method comprises steps of:

a) receiving live videos from a digital camera or a network camera;

b) analyzing live videos with a smoke auto-detection engine based on digital imaging processing and pattern recognition techniques;

c) identifying smoking conditions and generating a Smoke Level value in the range of 0 to 10 to represent the seriousness of the smoking events;

d) sending the Smoke Level data to the plant distributed control system (DC S) or other control devices to generate alarms; and e) using the Smoke Level data to enable automatic or manual control actions to stop the flare from smoking.

The invention, together with additional features and advantages thereof, may best be understood by reference to the following description taken in conjunction with the accompanying illustrative drawings.

DETAILED DESCRIPTION OF THE INVENTION

In this patent, the term "mechanism" is used to represent hardware, software, or any combination thereof. The term "process" is used to represent a physical system or process with inputs and outputs that have dynamic relationships. The term "flare" is used to represent a flare stack, which is a gas combustion device used in industrial plants such as petroleum refineries, chemical plants and natural gas processing plants, to burn off excessive gases for safety and chemical destruction purposes. The term "Smoke Level" is a value in the range of 0 to 10, where 0 means no smoke and 10 indicates that the flare has the highest smoking condition. The term "Area of Interest (AOI)" is a user selectable window on a flare video which should include the flare video and the areas above the flare where smoke should show. The term "Smoke Detection Index (SDI)" is a real value between 0.0 to 10.0 that has a direct relationship between the actual detected smoke and the Smoke Level. The term "EPA" is an acronym for the Environmental Protection Agency of the United States. The term "DCS" is an acronym for distributed control system. The term "computer system" refers to a computer system that implements the flare live video monitoring, smoke auto-detection, alarming, control override, historical data analysis, and flare smoke tracking functions described in this patent.

Throughout this document, n=1, 2, 3, . . . , as an integer, which is used to indicate the number of flares in the entire system.

Without losing generality, all numerical values given in this patent are examples. Other values can be used without departing from the spirit or scope of the invention. The description of specific embodiments herein is for demonstration purposes and in no way limits the scope of this disclosure to exclude other not specially described embodiments of this invention.

Figure 1:
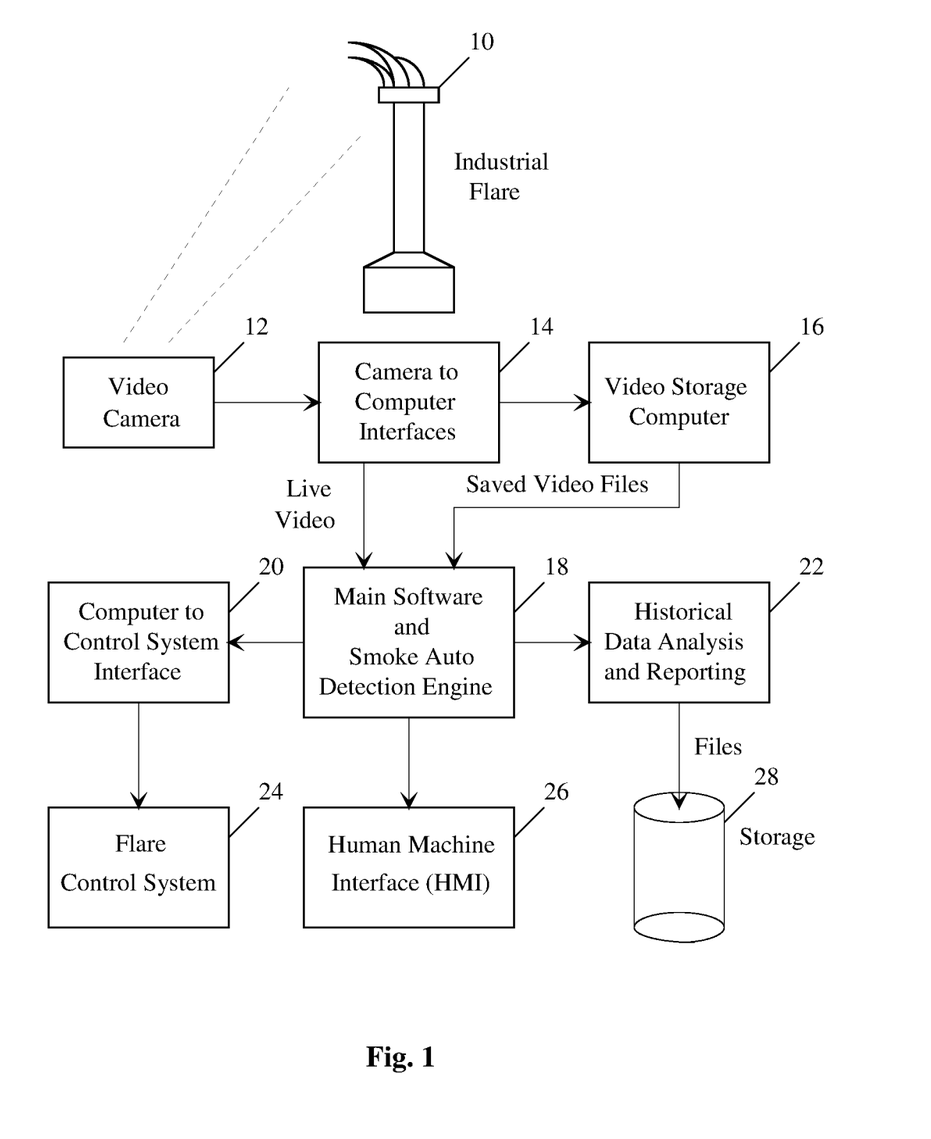
FIG. 1 is a diagram illustrating a flare smoke auto-detection system that comprises a flare, a video camera, and a computer system that can process flare videos in real-time with smoke auto-detection, alarming, control, historical data analysis and reporting functions, according to an embodiment of this invention.

FIG. 1 is a diagram illustrating a flare smoke auto-detection system that comprises a flare, a video camera, and a computer system that can process flare videos in real-time with smoke auto-detection, alarming, control, historical data analysis and reporting functions, according to an embodiment of this invention. The system comprises an industrial flare 10, a video camera 12, a camera to computer interface mechanism 14, a video storage computer 16, a main computer software mechanism with smoke auto-detection engine 18, a computer to control system interface mechanism 20, a historical data analysis and reporting mechanism 22, a flare control system 24, a human-machine-interface (HMI) mechanism 26, and a data storage 28.

The industrial flare 10 can be any of those used in refineries and chemical plants to burn off excessive gases for safety and chemical destruction purposes. The video camera 12 can be any IP network camera that can send live videos to one or multiple computers or decoders for video viewing and storage. The camera to computer interface mechanism 14 enables a computer to receive live video streams from a digital camera or an IP network camera. The video storage computer 16 can save flare videos in the computer for future viewing, smoke event tracking, and EPA auditing purposes.

The main computer software mechanism with smoke auto-detection engine 18 can automatically detect smoke conditions using image processing and pattern recognition techniques. The smoke auto-detection engines that can be used in this embodiment are any of known techniques described in the book "Digital Image Processing" by Rafael C. Gonzalez and Richard E. Woods, published by Pearson, which book and its contents are herein expressly incorporated by reference, in their entirety. For instance, the flare smoke can be detected based on a number of variables including color, shape, contrast from the background, and object movements, etc.

The computer to control system interface mechanism 20 can be based on industrial digital communication standards including Modbus, Modbus TCP, and OPC (OLE for Process Control). The flare control system 24 is typically implemented in a Distributed Control System (DCS) in the plant that can control the vent gas flow, assisted gas flow, steam flow, air flow, vent gas net-heating value, and combustion zone heating value of the flare. The flare control system is critical in order to allow the flare to operate without smoke. Smoking events typically happen when the vent gas has too much hydro-carbon but not enough oxygen. In other words, when there is not enough oxygen for combustion, smoke is produced and can be seen. The historical data analysis and reporting mechanism 22 can analyze the saved Smoke Level data based on the EPA 5-minute rule and present the results to the user with various software screens and functions. The human-machine-interface (HMI) mechanism 26 includes a number of computer screens that allow the user to configure, view, and monitor the flare smoke auto-detection system. The data storage 28 saves historical files for Smoke Level data and related date and time stamps.

Figure 2:
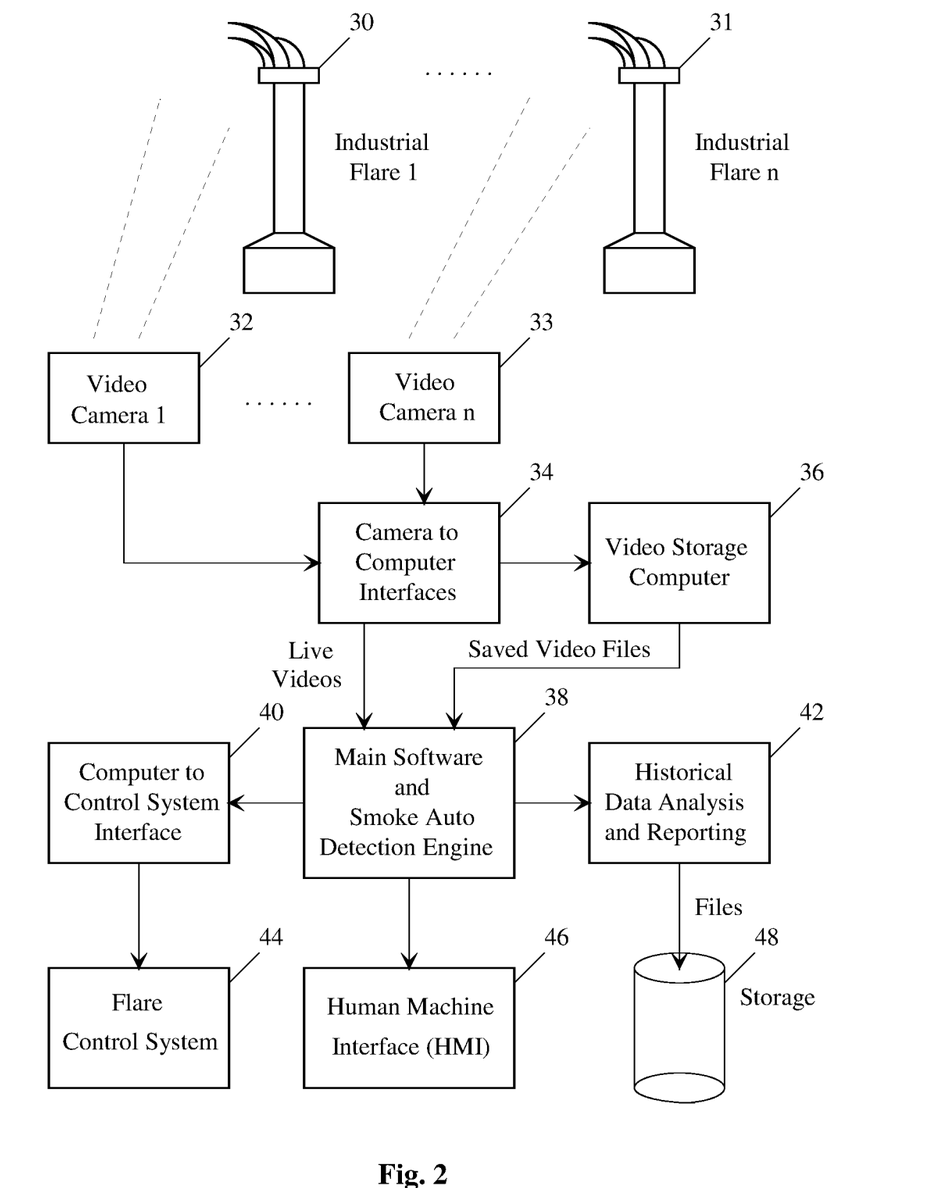
FIG. 2 is a diagram illustrating a flare smoke auto-detection system that comprises multiple flares, multiple video camera, and a computer system that can process flare videos in real-time with smoke auto-detection, alarming, control, historical data analysis and reporting functions, according to an embodiment of this invention.

FIG. 2 is a diagram illustrating a flare smoke auto-detection system that comprises multiple flares, multiple video cameras, and a computer system that can process flare videos in real-time with smoke auto-detection, alarming, control, historical data analysis and reporting functions, according to an embodiment of this invention. The system comprises a plurality of industrial flares 30, and 31, a plurality of video cameras 32, and 33, a camera to computer interface mechanism 34, a video storage computer 36, a main computer software mechanism with smoke auto-detection engine 38, a computer to control system interface mechanism 40, a historical data analysis and reporting mechanism 42, a flare control system 44, a human-machine-interface (HMI) mechanism 46, and a data storage 48.

In an industrial plant, there are typically a number of flares. It is more convenient and cost effective to have one flare smoke auto-detection system that can process flare videos in real-time with smoke auto-detection, alarming, control, historical data analysis and reporting functions for all available flares. In this regard, the system described in FIG. 2 achieves this purpose. The functions for the key components described in FIG. 1 are the same as those in FIG. 2. They include industrial flares, flare video cameras, camera to computer interface mechanism, video storage computer, the main computer software mechanism with smoke auto-detection engine, the computer to control system interface mechanism, the historical data analysis and reporting mechanism, flare control system, human-machine-interface (HMI) mechanism, and data storage.

It is important to know that the main software and smoke auto-detection engine can be implemented in an independent computer. However, the same software can potentially run inside the video storage computer as well. Since computer systems can support multiple displays, remote window displays, or screens on smart phones, the HMI mechanism can be used by multiple users in different computers or mobile devices. In addition, the historical data analysis and reporting functions can also be used by multiple users on different computers or mobile devices.

Figure 3:
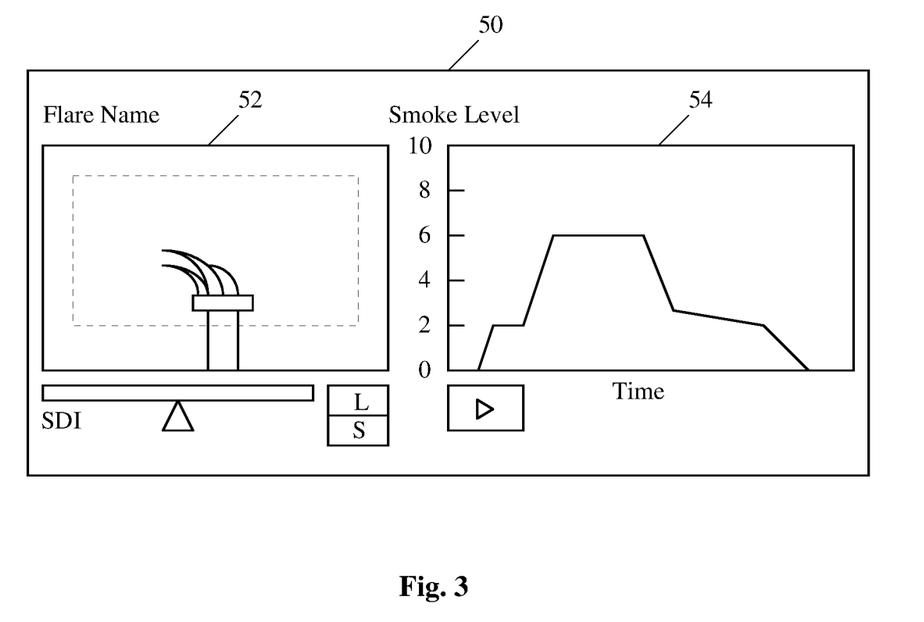
FIG. 3 is a graph showing a flare video image and a time-amplitude diagram illustrating the flare Smoke Level for configuration and saved video viewing purposes, according to an embodiment of this invention.

FIG. 3 is a graph showing a flare video image and a time-amplitude diagram illustrating the flare Smoke Level for configuration and saved video viewing purposes, according to an embodiment of this invention.

The flare smoke auto-detection system disclosed in this patent has a configuration mode that can view saved flare videos so that each flare and camera can be calibrated using a user selectable Area of Interest (AOI) and a user selectable Smoke Detection Index (SDI) for the smoke auto-detection mechanism. In FIG. 3, graph 50 is a representation of a computer screen in the configuration mode that shows a video window 52 and a time-amplitude diagram 54. Saved flare videos can be viewed in video window 52. The corresponding flare smoke conditions of the flare videos are reported using the Smoke Level, a value in the range of 0 to 10, where 0 means no smoke and 10 indicates that the flare has the highest smoking condition. The time-amplitude diagram 54 shows the Smoke Level.

Figure 4:
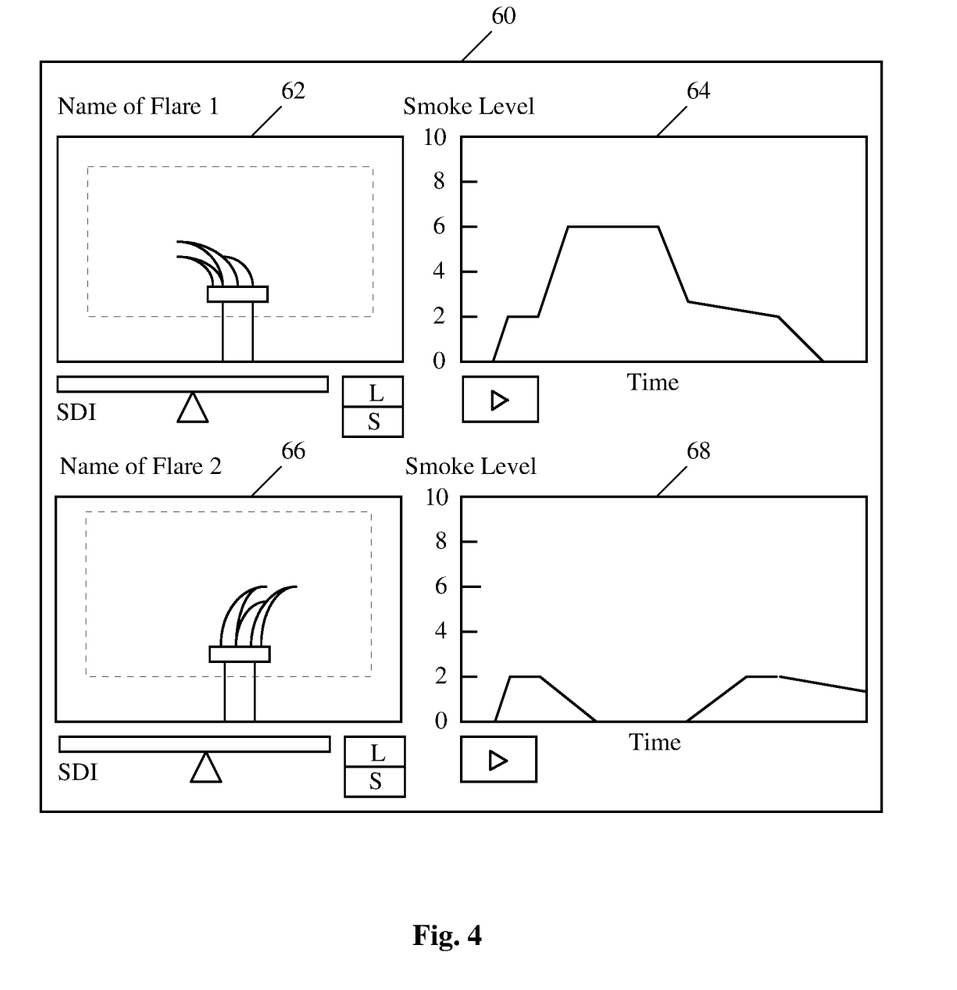
FIG. 4 is a graph showing two flare video images and two corresponding time-amplitude diagrams illustrating the Smoke Level for each flare for configuration and saved video viewing purposes, according to an embodiment of this invention.

FIG. 4 is a graph showing two flare video images and two corresponding time-amplitude diagrams illustrating the Smoke Level for each flare for configuration and saved video viewing purposes, according to an embodiment of this invention.

In an industrial plant, there are usually multiple flares. It is desirable to have one computer system to monitor and detect smoking events for multiple flares. In FIG. 4, graph 60 is a representation of a computer screen in the configuration mode that shows a video window 62 and a time-amplitude diagram 64 for Flare 1. It also shows a video window 66 and a time-amplitude diagram 68 for Flare 2. Saved flare videos can be viewed in video windows 62 and 68. The corresponding flare smoke conditions of the flare videos are reported using the Smoke Level. The time-amplitude diagrams 64 and 68 show the Smoke Level for the related flare, respectively.

Figure 5:
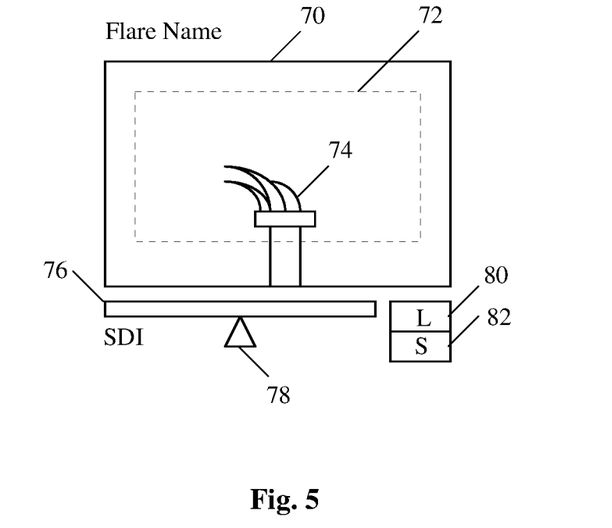
FIG. 5 is a graph showing a flare video image with a user selectable window to determine an Area of Interest (AOI) and a user selectable bar to determine a Smoke Detection Index (SDI) for the flare video so that each camera and flare can be calibrated for a smoke auto-detection mechanism, according to an embodiment of this invention.

FIG. 5 is a graph showing a flare video image with a user selectable window to determine an Area of Interest (AOI) and a user selectable bar to determine a Smoke Detection Index (SDI) for the flare video so that each camera and flare can be calibrated for a smoke auto-detection mechanism, according to an embodiment of this invention.

FIG. 5 illustrates the left portion of the computer screen of FIG. 3 in more details. Saved flare videos can be viewed in video window 70. A user selectable window 72 defines the area of interest (AOI), which should include the video image of flare 74 and the areas above the flare where smoke should show, if any. The user can use a computer mouse to draw the area of interest (AOI). The smoke auto-detection mechanism runs digital imaging processing algorithms inside the area of interest (AOI). This way, the video images outside the Area of Interested will not be processed to save computing time allowing the smoke auto-detection mechanism to work more efficiently and effectively.

In the U.S., the Environmental Protection Agency (EPA) has published its Method 22 procedures for conducting Rule 1155 visible emissions observations in CFR Part 60. This means, EPA has a standard procedure for a human to determine whether a flare is smoking or not. Now, the question is how can we relate an artificial-intelligent (AI) based flare smoke auto-detection mechanism to a human based smoke observation standard. The slide bar 76 and user movable pointer 78 are used to allow the user to enter a Smoke Detection Index (SDI) for the flare video. The Smoke Detection Index is a real value between 0.0 to 10.0 that has a direct relationship between the actual detected smoke and the Smoke Level. This allows the user to select how the smoking events are reported using the Smoke Level based on his own judgment and preference.

The values of both Area of Interest (AOI) and smoke detection index (SDI) can be saved in a database file so that they can be loaded when the smoke auto-detection software starts. As shown in FIG. 5, a computer software button 80 allows the user to manually load the saved AOI and SDI. The software button 82 allows the user to manually save the newly selected AOI and SDI.

Figure 6:
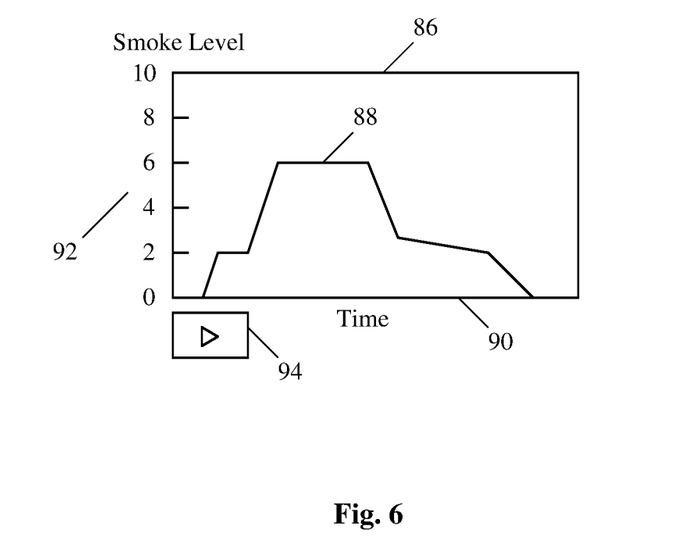
FIG. 6 is a graph showing a time-amplitude diagram illustrating the flare Smoke Level relating to flare smoking conditions, according to an embodiment of this invention.

FIG. 6 is a graph showing a time-amplitude diagram illustrating the flare Smoke Level relating to flare smoking conditions, according to an embodiment of this invention. FIG. 6 illustrates the right portion of the computer screen of FIG. 3 in more details. In FIG. 6, the time-amplitude diagram 86 is a trend that shows the Smoke Level 88 based on the x-axis scale in time and y-axis scale in Smoke Level between 0.0 to 10.0, where 0 means there is no smoke and 10.0 means the smoke has reached its highest condition. A computer software button 94 allows the user to start and stop playing a flare video.

Figure 7:
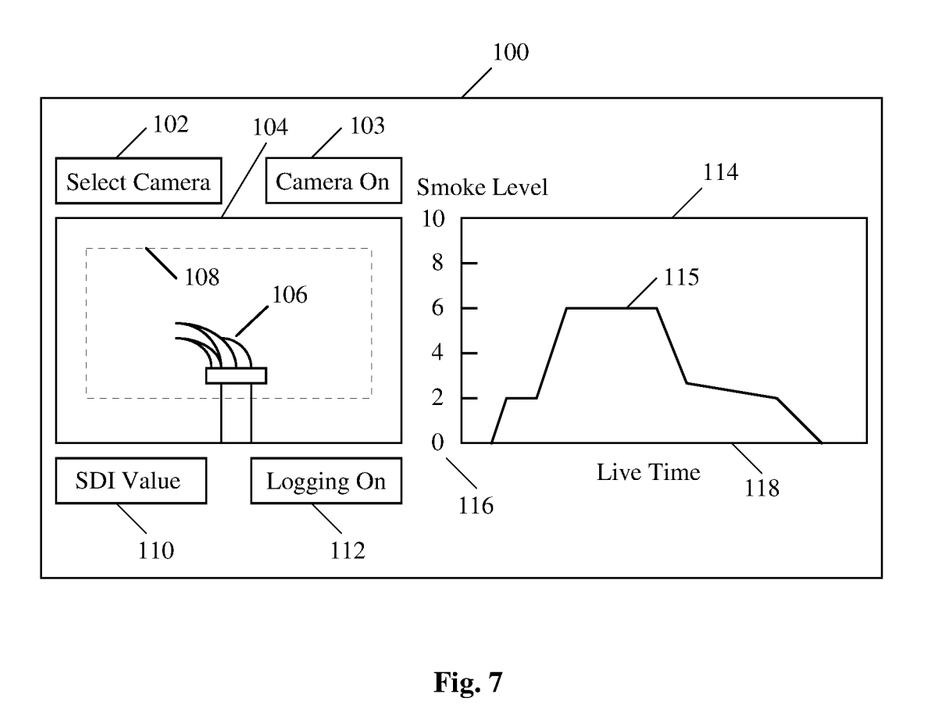
FIG. 7 is a graph showing a live flare video image and a time-amplitude diagram illustrating the flare Smoke Level for real-time smoke auto-detection, alarming, and control purposes, according to an embodiment of this invention.

FIG. 7 is a graph showing a live flare video image and a time-amplitude diagram illustrating the flare Smoke Level for real-time smoke auto-detection, alarming, and control purposes, according to an embodiment of this invention.

The flare smoke auto-detection system disclosed in this patent has an online mode that can view live flare videos. In FIG. 7, graph 100 is a representation of a computer screen in the online mode that shows a video window 104 and a time-amplitude diagram 114. A computer software button 102 allows the user to select a flare camera to connect and view live videos for smoke auto-detection. A computer software button 103 allows the user to turn on or off the camera. Live flare videos received from the selected camera can be viewed in video window 104. The corresponding flare smoke conditions of the flare videos are reported using the Smoke Level. The time-amplitude diagram 114 shows the Smoke Level trend 115 in real time. The x-axis 118 illustrates the live time and y-axis 116 shows the Smoke Level scale.

In FIG. 7, a user selectable Area of Interest (AOI) window 108 for flare 106 and a user selectable Smoke Detection Index (SDI) value entry box 110 are shown. The AOI and SDI may have already been determined in the configuration mode. However, the AOI and SDI can also be determined or modified in the on-line mode. A software button 112 allows the user to toggle the logging on/off function for the Smoke Level data. In other words, if the user does not want to log the Smoke Level data in a historical file, the software button 112 allows for that.

Figure 8:
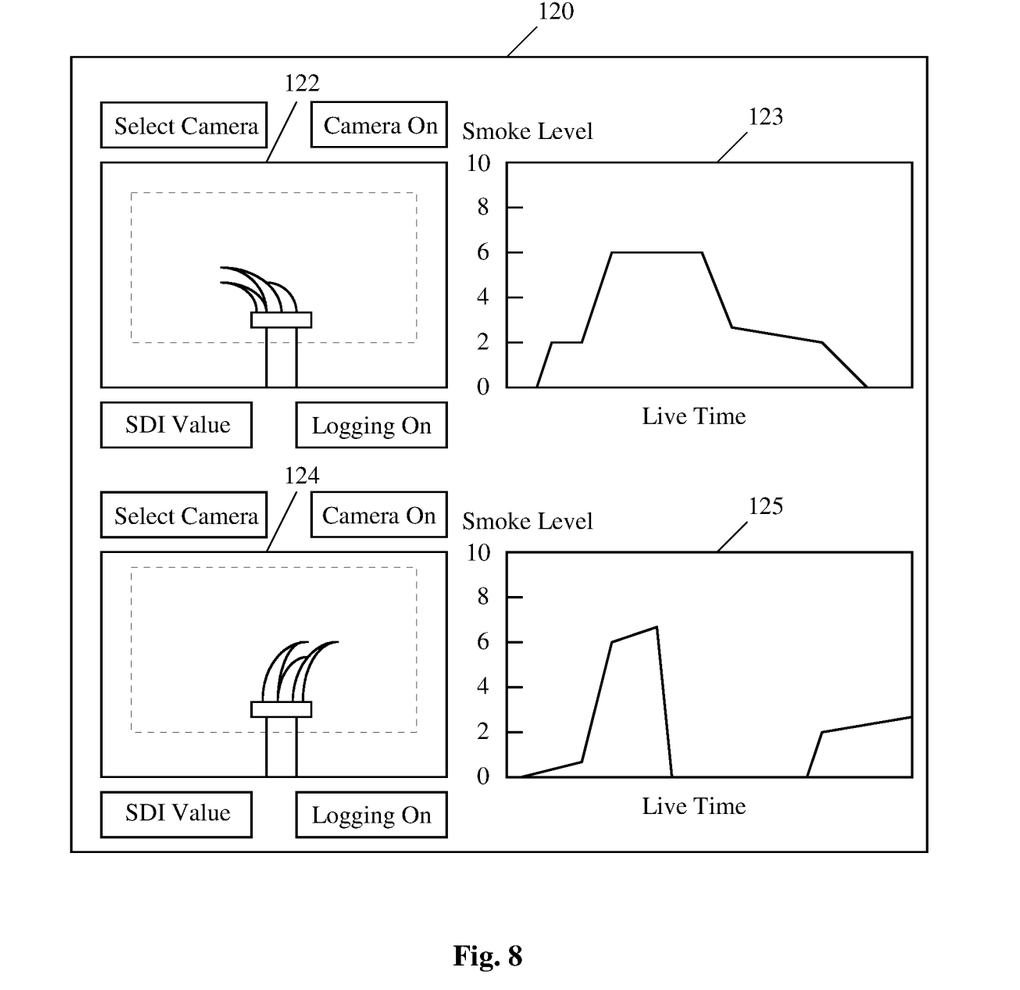
FIG. 8 is a graph showing two live flare video images and two corresponding time-amplitude diagrams illustrating the Smoke Level for each flare for real-time smoke auto-detection, alarming, and control purposes, according to an embodiment of this invention.

FIG. 8 is a graph showing two live flare video images and two corresponding time-amplitude diagrams illustrating the Smoke Level for each flare for real-time smoke auto-detection, alarming, and control purposes, according to an embodiment of this invention.

Since there are typically multiple flares in an industrial plant, it is desirable to have one computer system to monitor and detect smoking events for multiple flares at the same time. In FIG. 8, graph 120 is a representation of a computer screen in the live online mode that shows a video window 122 and a time-amplitude diagram 123 for a selected camera on the top. It also shows a video window 124 and a time-amplitude diagram 125 for a selected camera at the bottom. In FIG. 8, the functions described in FIG. 7 are available for each respective flare camera. These functions include selecting a camera, turning the camera on or off, defining the Area of Interest, entering a Smoke Detection Index value, and enabling or disabling data logging. In order to allow the user to view multiple flares, multiple software windows similar to the ones described in FIG. 7 and FIG. 8 can be made available.

Figure 9:
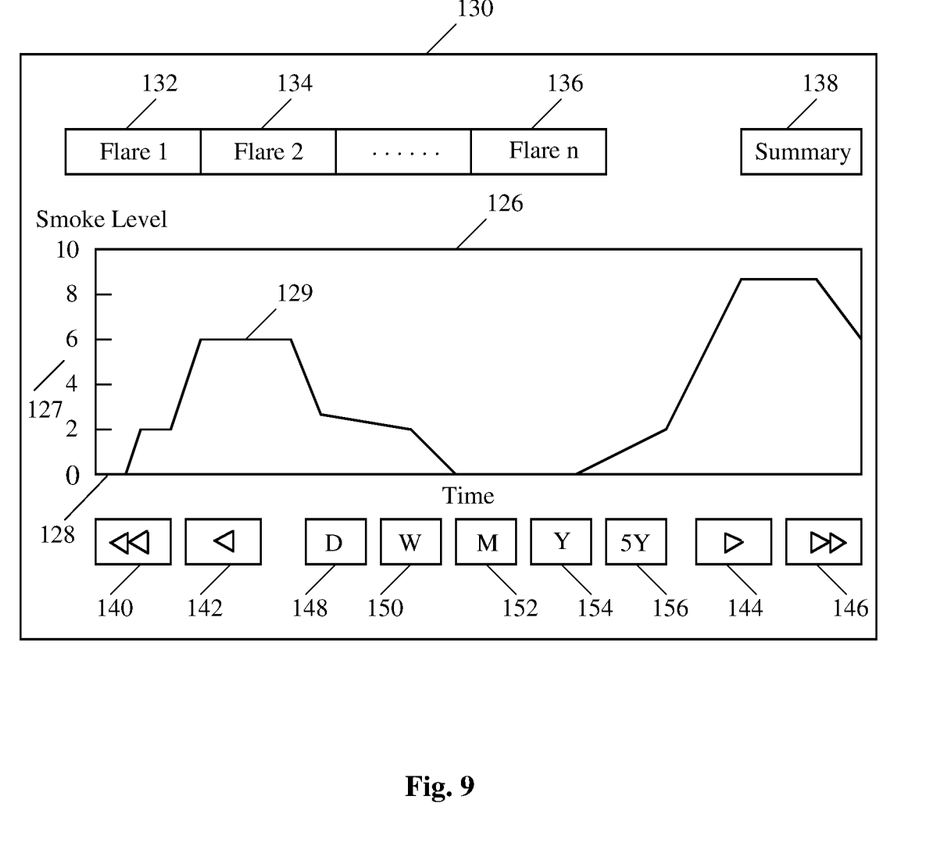
FIG. 9 is a graph showing a time-amplitude diagram illustrating the historical data of flare Smoke Level with date and time stamps for smoke event tracking and reviewing, according to an embodiment of this invention.

FIG. 9 is a graph showing a time-amplitude diagram illustrating the historical data of flare Smoke Level with date and time stamps for smoke event tracking and reviewing, according to an embodiment of this invention.

In the U.S., EPA requires that refineries save at least 5 years of flare videos so that they are ready for EPA's audit for emission compliances. It is tedious for the plant environmental team to identify and record smoking events by watching saved videos. Since the flare smoke auto-detection mechanism has already generated the Smoke Level to quantify the seriousness of the smoking events, the Smoke Level data can be saved in historical files with time stamps to help the plant environmental team manage smoking event data for reporting and auditing purposes.

In FIG. 9, graph 130 is a representation of a computer screen where the flare smoke auto-detection system works in a historical mode. The user can select saved historical files for one or multiple flares from the software button 132 for Flare 1, button 134 for Flare 2, and button 136 for Flare n. The Summary software button 138 allows the user to retrieve and view data for available flares.

In FIG. 9, the time-amplitude diagram 126 shows the Smoke Level trend 129 based on the x-axis of time 128 and y-axis of smoke level 127. The computer software button 140 allows the user to show the earliest saved historical data, and the button 142 allows the user to go back to look for earlier historical data. The software button 144 allows the user to go forward to look for more recent historical data, and the button 146 allows the user to show the most recent saved historical data. Based on the needs, the user can also show the daily data by using software button 148, weekly data by using button 150, monthly data by using button 152, yearly data by using button 154, and 5-year data by using button 156. These features are very useful for the plant environmental team to efficiently view and track smoking events for reporting and EPA auditing.

Figure 10:
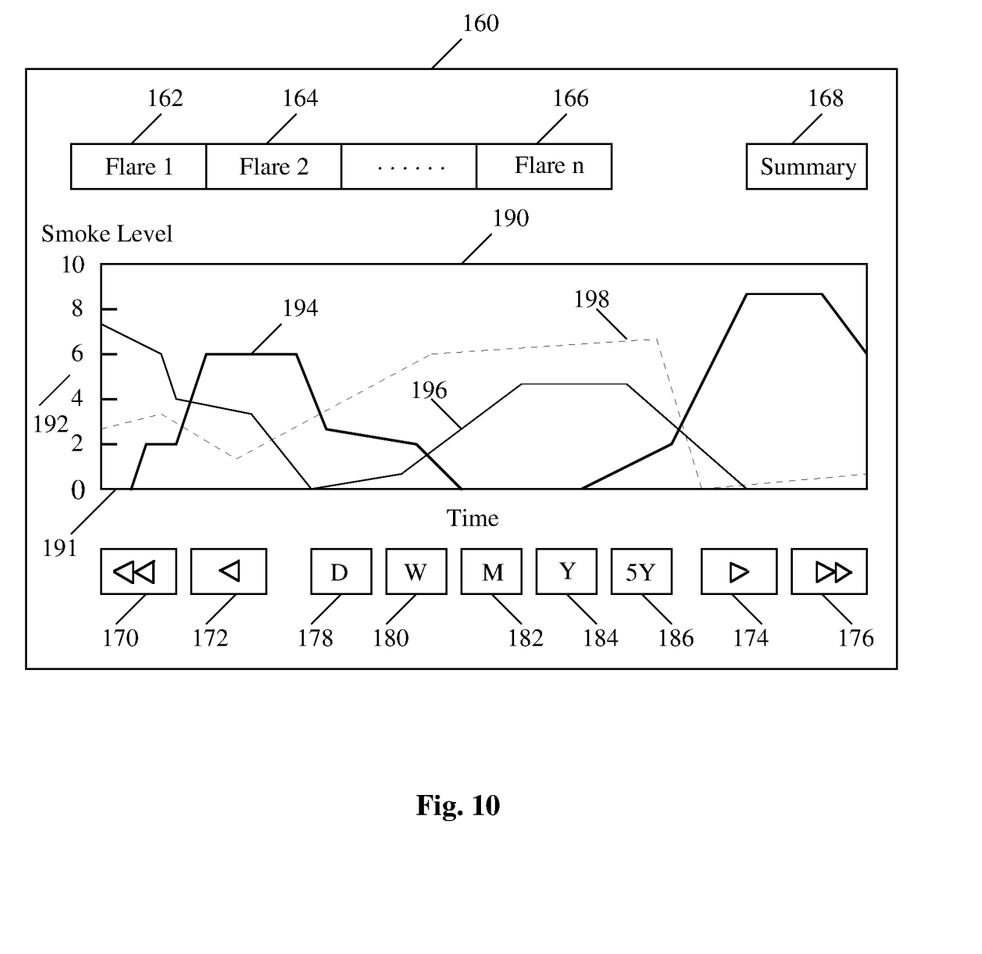
FIG. 10 is a graph showing multiple time-amplitude diagrams for multiple flares illustrating the historical data of flare Smoke Level with date and time stamps for smoke event tracking and reviewing, according to an embodiment of this invention.

FIG. 10 is a graph showing multiple time-amplitude diagrams for multiple flares illustrating the historical data of flare Smoke Level with date and time stamps for smoke event tracking and reviewing, according to an embodiment of this invention.

In FIG. 10, graph 160 is a representation of a computer screen where the flare smoke auto-detection system works in a historical mode. The user can select saved historical files for one or multiple flares from the software button 162 for Flare 1, button 164 for Flare 2, and button 166 for Flare n.

When the user selects all flares using the Summary software button 168, the time-amplitude diagram 190 shows multiple Smoke Level trends 194, 196, and 198 based on the x-axis of time 191 and y-axis of smoke level 192. The computer software button 170 allows the user to show the earliest saved historical data, and the button 172 allows the user to go back to look for earlier historical data. The software button 174 allows the user to go forward to look for more recent historical data, and the button 176 allows the user to show the more recent saved historical data. Based on the needs, the user can also show the daily data by using software button 178, weekly data by button 180, monthly data by button 182, yearly data by button 184, and 5-year data by button 186. In this summary trend, the saved Smoke Level data can be seen based on the selected day, week, month, and year as well as all 5-year data for all flares. These functions are quite powerful and useful for the plant environmental team to efficiently view and track smoking events for reporting and EPA auditing.

Figure 11:
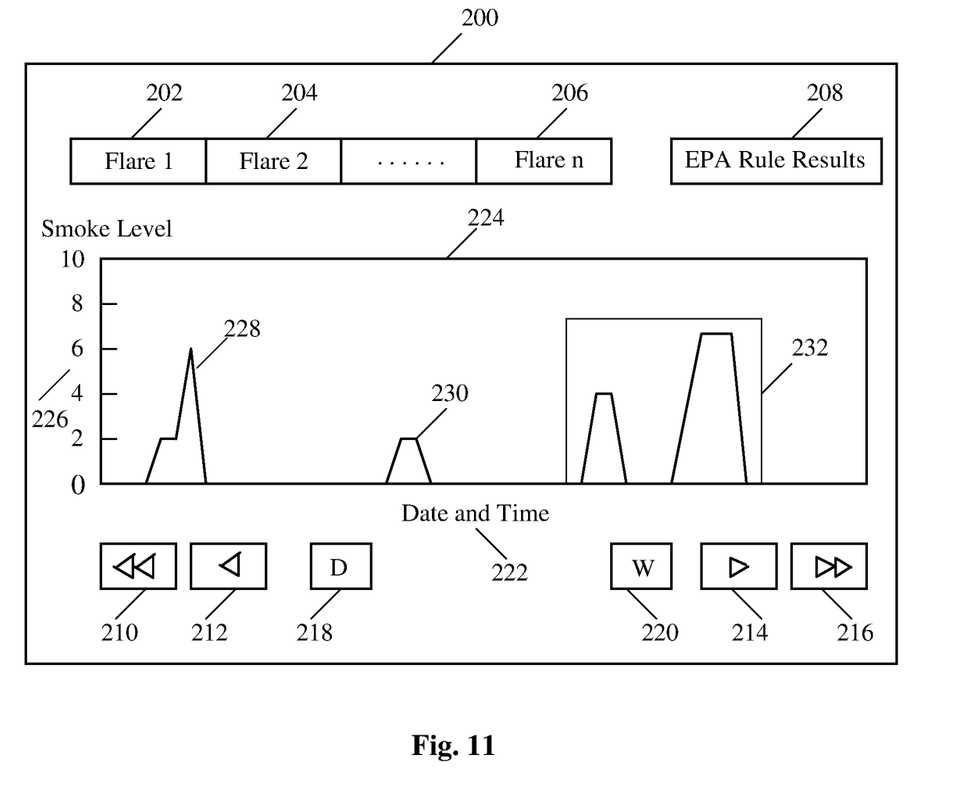
FIG. 11 is a graph showing a time-amplitude diagram illustrating the historical data of flare Smoke Level, where the data violating EPA's no visible emission rules are marked with date and time stamps, according to an embodiment of this invention.

FIG. 11 is a graph showing a time-amplitude diagram illustrating the historical data of flare Smoke Level, where the data violating EPA's no visible emission rules are marked with date and time stamps, according to an embodiment of this invention.

In the U.S., EPA rules (CFR-60.18) require industrial flares to operate with no visible emissions, except for periods not to exceed a total of 5 minutes during any 2 consecutive hours. This means, if the industrial plant can detect and stop flare smoking quickly, it may not violate the related EPA rules, even if the flare may have smoked.

In FIG. 11, graph 200 is a representation of a computer screen where the flare smoke auto-detection system works in a special historical mode. The user can select saved historical files for one or multiple flares from the software button 202 for Flare 1, button 204 for Flare 2, and button 206 for Flare n.

When the user selects the EPA Rule Results button 208, the time-amplitude diagram 224 shows a Smoke Level trend with indicated time periods 228, 230, and 232 based on the x-axis of date and time 222 and y-axis of smoke level 226. The marked box 232 indicates that the Smoke Level of the selected flare has violated the EPA rules. On diagram 224, the Smoke Level trend 228 and 230 do not have an alarm box to indicate the violation of the EPA rule because the smoking periods did not exceed a total of 5 minutes during any 2 consecutive hours. On the other hand, the marked alarm box 232 shows that the smoking periods inside the box have violated the EPA rules.

The software button 210 allows the user to show the earliest saved historical data, and button 212 allows the user to go back to look for earlier historical data. The software button 214 allows the user to go forward to look for more recent historical data, and button 216 allows the user to show the most recent saved historical data. Based on the needs, the user can also show the daily data by using software button 218 and weekly data by using button 220. This special historical mode that can identify smoking events based on EPA rules can further help the plant environmental team track smoking events for reporting and EPA auditing.

Figure 12:
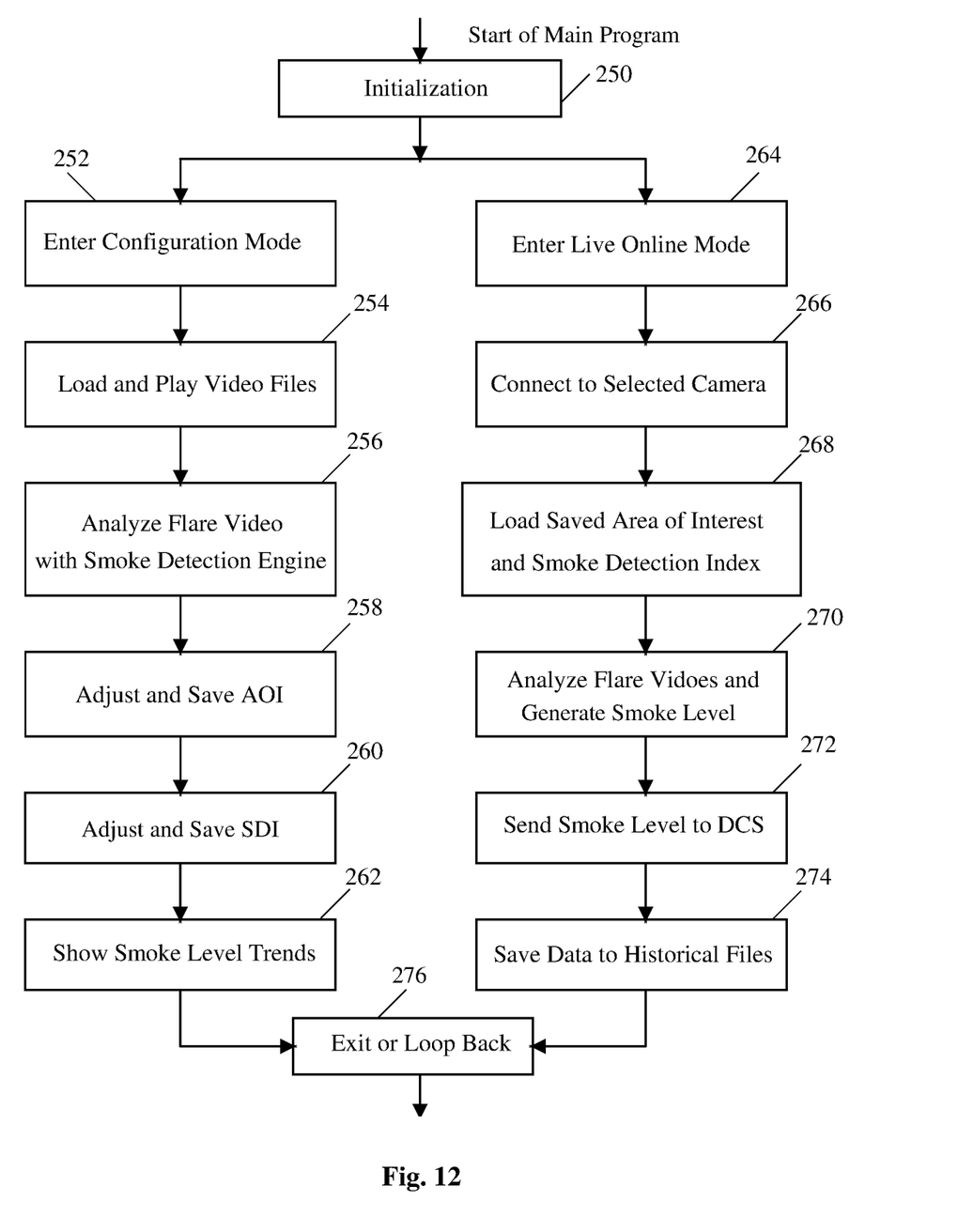
FIG. 12 is a flow chart describing the main software program for flare smoke auto-detection with a configuration mode and a live online mode, according to an embodiment of this invention.

FIG. 12 is a flow chart describing the main software program for flare smoke auto-detection with a configuration mode and a live online mode, according to an embodiment of this invention. In FIG. 12, at Block 250, initialization is taking place in the computer software level, computer networks, and peripheral level relating to video cameras. For instance, during initialization, the saved Area of Interest (AOI) and Smoke Detection Index (SDI) may be loaded from a database file.

In the main program, there are two major modes: (1) configuration mode, and (2) live online mode. At Block 252, the program enters the configuration mode and allows the user to select a flare video file. At Block 254, the program loads the selected video file and plays the video based on a user's command. If no video file has been selected, the program will wait until a file is selected. At Block 256, the program analyzes the flare video based on the smoke auto-detection engine. At Block 258, the program allows the user to adjust and save the Area of Interest (AOI) for the selected camera. At Block 260, the program allows the user to adjust and save the Smoke Detection Index (SDI) for the selected camera. At Block 262, the program shows the Smoke Level in a time-amplitude diagram.

At Block 264, the program enters the live online mode and allows the user to select a flare camera. At Block 266, the program connects to the selected video camera. If no video camera has been selected by the user, the program will wait until a camera is selected so that the program can make the connection to the camera. At Block 268, the program loads the saved AOI and SDI values for the selected camera from the database file. At Block 270, the program analyzes the live flare video based on the smoke auto-detection engine and shows the Smoke Level data in real-time. At Block 272, the program sends the Smoke Level data to the plant distributed control system (DCS) that controls the related flare. This allows the DCS to generate an alarm to alert the operators, and take automatic control actions to add steam or air quickly so that the flare has sufficient oxygen for combustion. At Block 274, the program saves the Smoke Level data to a related historical file. At Block 276, the program from either the configuration mode or the online mode exits or loops back to continue its operations. The computer system should allow both online and configuration modes to work at the same time, as the system needs to work 24/7 to monitor the flares, automatically detect smoking conditions, and take control actions to stop the flare from smoking.

Conclusion

The Applicant is well known for its Model-Free Adaptive (MFA) control technology and products that have been widely deployed in industrial process control, building automation, and equipment control. The motivation to develop the flare smoke auto-detection technology described in this document came from actual demand by its customers in oil refineries that operate multiple flares. The inventive flare smoke auto-detection system along with its alarming, control override, historical data analysis, and smoke tracking functions can help the plant comply with EPA rules at all times and contribute to a cleaner and better world.

The invention claimed is:

1. A flare smoke auto-detection system, comprising:
   a) at least one industrial flare;
   b) at least one video camera; and
   c) a computer system that is programmed and configured to automatically analyze live videos, detect flare smoking conditions, and to generate and report a flare Smoke Level value in a range from a lower value to a higher value to represent seriousness of detected smoking events, wherein the flare Smoke Level value indicates an increasing level of smoke as the value increases.

2. The system of claim 1, wherein the computer system is programmed and configured to further perform alarming, control, and historical data analysis functions.

3. The system of claim 1, wherein the video camera is a digital camera or a network camera that can send live videos to one or multiple computers or decoders for video viewing and storage.

4. The system of claim 1, wherein the computer system comprises:
   a) a computer;
   b) a camera to computer interface mechanism;
   c) a video storage computer;
   d) a computer software mechanism with smoke auto-detection engine;
   e) a computer to control system interface mechanism;
   f) a historical data analysis and reporting mechanism;
   g) a human-machine-interface (HMI) mechanism; and
   h) a data storage.

5. A non-transitory computer software mechanism for flare smoke auto-detection, comprising:
   a) a smoke auto-detection engine, wherein the smoke auto-detection engine is programmed to generate a flare Smoke Level value in a range from a lower value to a higher value to represent seriousness of detected smoking events, wherein the flare Smoke Level value indicates an increasing level of smoke as the value increases;
   b) a camera to computer interface mechanism; and
   c) a human-machine-interface (HMI) mechanism.

6. The non-transitory computer software mechanism of claim 5, further comprising:
   a) a data storage; and
   b) a historical data analysis and reporting mechanism.

7. The non-transitory computer software mechanism of claim 5, wherein the flare Smoke Level value is generated in a range of 0 to 10.

8. The non-transitory computer software mechanism of claim 7, wherein the human-machine-interface (HMI) mechanism is programmed to comprise:
   a) a time-amplitude diagram that shows the flare Smoke Level value based on the x-axis scale in time and y-axis scale in Smoke Level between 0.0 to 10.0, where 0 means that there is no smoke and 10.0 means the smoke has reached its highest condition; and
   b) a computer software button that allows a user to start and stop playing a flare video.

9. The non-transitory computer software mechanism of claim 5, wherein the flare Smoke Level value generated by the smoke auto-detection engine is sent to a plant distributed control system (DC S) or other control devices so alarms can be generated and automatic or manual control actions can be taken to stop the flare from smoking.

10. The non-transitory computer software mechanism of claim 5, wherein the flare Smoke Level value is saved in historical files for reporting and smoke event tracking purposes.

11. The non-transitory computer software mechanism of claim 5, wherein the camera to computer interface mechanism is arranged for the computer to receive live video streams from a digital camera or a network camera.

12. The non-transitory computer software mechanism of claim 5, wherein the human-machine-interface (HMI) mechanism is programmed to show computer screens that allow a user to configure, view, and monitor the flare smoke auto-detection system.

13. The non-transitory computer software mechanism of claim 5, wherein the human-machine-interface (HMI) mechanism is programmed to comprise:
  a) at least one software window showing a flare video; and
  b) at least one time-amplitude diagram illustrating the flare Smoke Level value for configuration and saved video viewing purposes.

14. The non-transitory computer software mechanism of claim 5, wherein the human-machine-interface (HMI) mechanism is programmed to comprise:
  a) a graph showing a flare video with a user selectable window to determine an Area of Interest (AOI); and
  b) a user selectable bar to determine a Smoke Detection Index (SDI) for the flare video so that each camera and flare can be calibrated for the smoke auto-detection engine.

15. The non-transitory computer software mechanism of claim 5, wherein the human-machine-interface (HMI) mechanism is programmed to comprise:
  a) at least one graph showing a live flare video;
  b) a corresponding software button that allows a user to select a flare camera to connect and view live videos for smoke auto-detection;
  c) a corresponding software button that allows a user to toggle a logging on/off function for the flare Smoke Level value; and
  d) at least one time-amplitude diagram illustrating the flare Smoke Level value for real-time smoke auto-detection, alarming, and control purposes.

16. A non-transitory computer software mechanism for flare smoke auto-detection, comprising:
  a) a smoke auto-detection engine, wherein the smoke auto-detection engine is programmed to generate a flare Smoke Level value in a range from a lower value to a higher value to represent seriousness of detected smoking events, wherein the flare Smoke Level value indicates an increasing level of smoke as the value increases;
  b) a mechanism to allow the user to select and load saved flare video files; and
  c) a human-machine-interface (HMI) mechanism.

17. The non-transitory computer software mechanism of claim 16, wherein the flare Smoke Level value is saved in historical files for reporting and smoke event tracking purposes.

18. The non-transitory computer software mechanism of claim 16, wherein the flare Smoke Level value is generated in a range of 0 to 10.

19. The non-transitory computer software mechanism of claim 16, wherein the human-machine-interface (HMI) mechanism is programmed to comprise:
  a) at least one graph showing a time-amplitude diagram illustrating historical data of the flare Smoke Level value with date and time stamps for smoke event tracking and reviewing; and
  b) at least one software button that allows a user to select saved historical files for one or multiple flares.

20. The non-transitory computer software mechanism of claim 16, wherein the human-machine-interface (HMI) mechanism is programmed to comprise:
  a) a software button that allows a user to show the earliest saved historical data;
  b) a software button that allows a user to go back to look for earlier historical data;
  c) a software button that allows a user to go forward to look for more recent historical data;
  d) a software button that allows a user to show the most recent saved historical data;
  e) a software button that allows a user to show daily data;
  f) a software button that allows a user to show weekly data;
  g) a software button that allows a user to show monthly data;
  h) a software button that allows a user to show yearly data; and
  i) a software button that allows a user to show 5-year data.

21. The non-transitory computer software mechanism of claim 16, wherein the human-machine-interface (HMI) mechanism is programmed to comprise:
  a) at least one graph showing a time-amplitude diagram illustrating historical data of the flare Smoke Level value with date and time stamps for smoke event tracking and reviewing;
  b) at least one software button that allows a user to select saved historical files for one or multiple flares; and
  c) a Summary software button that allows a user to select the latest saved historical files for all flares.

22. The non-transitory computer software mechanism of claim 16, wherein the human-machine-interface (HMI) mechanism is programmed to comprise:
  a) at least one graph showing a time-amplitude diagram illustrating historical data of the flare Smoke Level value with date and time stamps for smoke event tracking and reviewing;
  b) at least one software button that allows a user to select saved historical files for one or multiple flares; and
  c) a software button that allows a user to see the smoking time periods that exceed a total of 5 minutes during any 2 consecutive hours, each of the time periods violating rules defined by a government regulatory agency.

\* \* \* \* \*